United States Patent [19]
Fonne et al.

[11] 3,869,309

[45] Mar. 4, 1975

[54] ANTISKID AGENT FOR BAGS

[75] Inventors: Gunnar Johan Fonne, Porsgrunn; Thor Helge Jahnsen, Siljan, both of Norway

[73] Assignee: Norsk Hydro A.S., Oslo, Norway

[22] Filed: Mar. 21, 1973

[21] Appl. No.: 343,473

[30] Foreign Application Priority Data
Mar. 21, 1972  Norway................................ 909/72

[52] U.S. Cl................ 117/138.8, 106/123, 156/327
[51] Int. Cl............................................... B44d 5/00
[58] Field of Search .......... 117/138.8 E; 260/124 R; 106/123 R; 123 LC; 156/327

[56] References Cited
UNITED STATES PATENTS

| | | |
|---|---|---|
| 2,727,028 | 12/1955 | Russell et al..................... 106/123 X |
| 2,871,155 | 1/1959 | Klomparens et al................ 106/123 |
| 2,933,405 | 4/1960 | Witt et al............................ 106/123 |
| 3,018,195 | 1/1962 | Kelly et al......................... 117/138.8 |
| 3,232,925 | 2/1966 | King et al. ............................ 260/124 |
| 3,246,831 | 4/1966 | Teicher......................... 117/138.8 X |
| 3,438,825 | 4/1969 | Fidler............................ 117/138.8 X |
| 3,598,677 | 8/1971 | Bergmeister et al.............. 106/36 X |
| 3,699,091 | 10/1972 | Dimitri et al. ....................... 260/124 |

FOREIGN PATENTS OR APPLICATIONS

| | | |
|---|---|---|
| 679,819 | 2/1964 | Canada............................... 106/123 |

*Primary Examiner*—William E. Schulz
*Attorney, Agent, or Firm*—Wenderoth, Lind & Ponack

[57] ABSTRACT

There is disclosed an antiskid agent for bags, in the form of an aqueous or predominantly aqueous solution, which contains a soluble lignin compound and does not contain any added polymerization promoting components.

4 Claims, 1 Drawing Figure

PATENTED MAR 4 1975
3,869,309
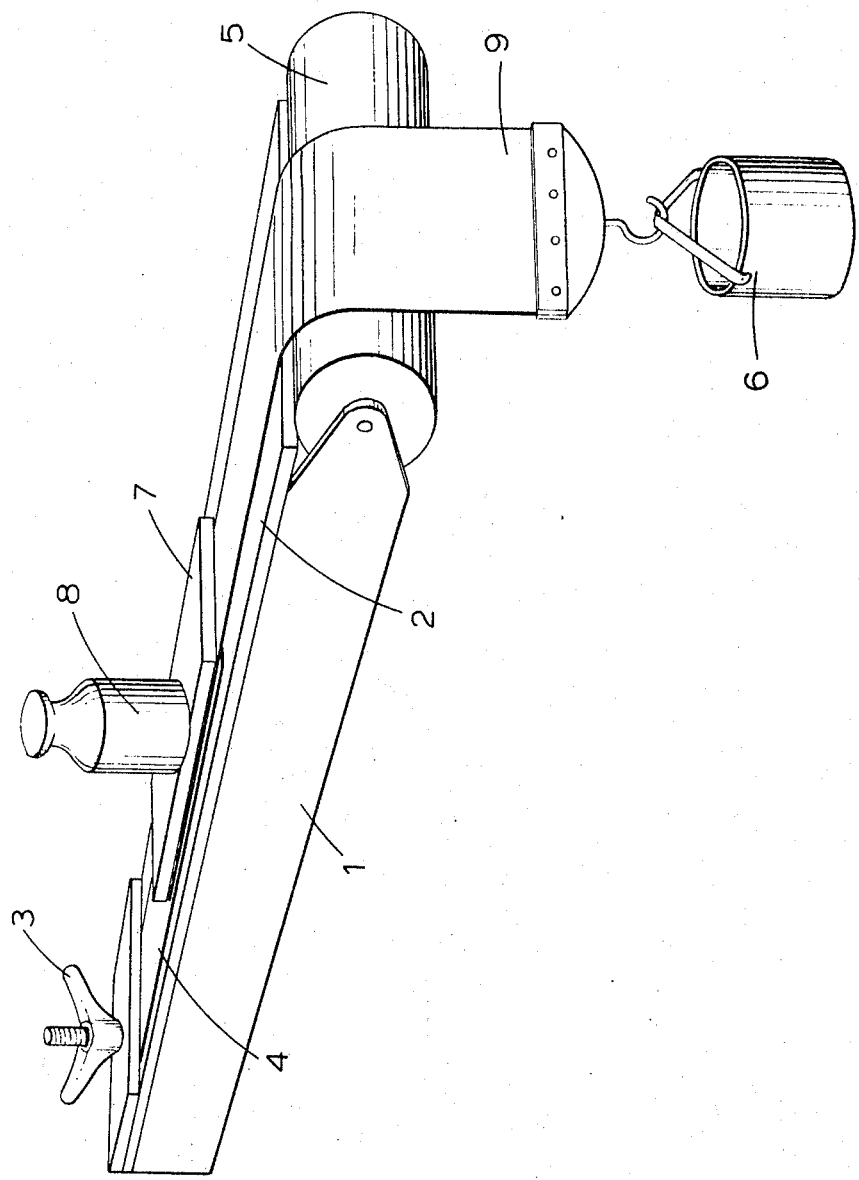

ANTISKID AGENT FOR BAGS

This invention relates to a new antiskid agent for bags, especially plastic bags or plastic-covered bags, to prevent them from skidding in relation to each other.

In palletizing bags one of the great problems has been to find suitable antiskid agents which ensure adequate contact between bags during palletizing, as well as during subsequent storage and transport.

A commercially acceptable antiskid agent for bags should have the following properties.

1. It should have sufficiently good wetting power on plastic, especially polyolefine plastic, and should adhere well to the substrate in the dry state.
2. It should have sufficiently good frictional properties immediately after application and palletizing (wet strength)
3. It should be suitable for plastic as well as paper bags since both types are often stacked together on one and the same pallet.
4. It should not cause bags to adhere to each other to the extent that depalletizing causes extra work, or damage to the bags when being separated from each other.
5. It should be suitable for use with conventional coating equipment (rollers, spray jets, etc.).
6. The agent should not contain inflammable or toxic substances.
7. It should be simple and economic in production.

The so-called silica-sols, silicon dioxide particles dispersed in water, have long been used as antiskid agents for paper bags. However, these are not suitable for plastic bags, which are now being used to an increasing extent, and so far we know of no antiskid agent which will provide an adequate solution to the problem. Neither can commercially available adhesives for plastic be used, since they cause the bags to adhere to strongly to each other, and in addition they are difficult to apply to the bags. Known, water-soluble film-forming polymers have also been tried, but without satisfactory results. Like silica-sol type antiskid agents, these polymers do not wet the plastic surface, but form droplets and pearls which peel off after drying. Thus it is not possible to obtain a satisfactory wet strength or a satisfactory antiskid effect after drying.

Effort has therefore been made to find suitable additives which would modify the properties of the silica-sols or the water-soluble film-forming polymers in such a way that they could also be used on plastic surfaces. It has been asserted that the addition of acids and film-forming polymers such as polyvinyl alcohol or carboxymethyl cellulose, will provide the proper adhesion to polyolefine surfaces, provided that the pH is adjusted to somewhere between 2 to 5, see U.S. Pat. No. 3.520.242. Therefore tests have been made with these agents in an effort to solve the skidding problems connected with bags, but no satisfactory result has been achieved.

Further, it is known per se that lignosulphonates improve wetting. This is apparent from U.S. Pat. No. 2.978.342, which relates to the use of calcium and magnesium lignosulphonate to obtain improved adhesion of asphalt to various types of moist road surfaces.

The utilization of a reaction product between a concentrated sulphite liquor and phosphoric acid as an adhesive is kown from U.S. Pat. No. 2.457.257, and it is stated among other things that his reaction production can be utilized as an adhesive when stacking cartons (palletizing adhesive). The phosphoric acid will initiate a polymerization of the lignin in the sulphite liquor and result in a polymerized, viscous material which is unable to wet an underlying surface, especially not plastic. It is of prime importance, as mentioned above, that an antiskid agent wets the underlying surface so that it flows out to form a homogeneous film. Unsatisfactory wetting properties will be revealed by the fact that the agent forms small droplets on the surface, resulting in spot adhesion and inferior wet strength, as well as problems when separating the bags after drying, e.g., damage to the bags at these points.

Surprisingly it has now been found that lignin alone, without the addition of polymerizing components, has a special ability to wet hydrophobic and water-repellant plastic. When a soluble lignin composition is added to water and applied to the surface of a polyolefine film, it readily spreads over the surface and completely wets it, When the surface of two films wetted in this way are placed face to face they strongly adhere to each other. It has further been proved that pH has no significance in relation to these compositions. We have carried out experiments with alkaline lignins of the sodium type, as well as lignosulphonates such as calcium lignosulphonate, sodium lignosulphonate, ammonium lignosulphonate and magnesium lignosulphonate. Ammonium lignosulphonate has a pH of 4.3, sodium lignosulphonate a pH of 7 and sodium lignin of pH of 11. All these compositions act in more or less the same way. Thus the positive effect is not restricted to any special pH, and must be due to some structural property or other of the lignin. With this as a starting point we have thus realized that these lignin compositions can be used for a specific, practical purpose, viz. as commercially acceptable antiskid agent for bags, especially plastic bags and plastic covered bags.

When an aqueous solution of lignin composition of the above type was used in a bag palletizing machine, unusually strong adhesion was achieved immediately following application, while the coating was still wet, so that the bags also remained in position immediately after they were palletized. Relatively little force is required to separate the bags after drying, but the friction is still sufficient to keep each bag in place during subsequent transportation and storage.

The coating remaining on the bags after they are separated can be reactivated by wetting. This is a great advantage if it is required to repalletize bags. The reactivating property can be further utilized, by applying the antiskid agent during the actual production of the bags, thus enabling the producer to supply them with the antiskid agent already applied. The description below gives some examples of lignin compositions and concentrations suitable for use in bag palletizing.

EXAMPLE 1

Standard 50 kg polyethylene bags were roller-coated with a 10 % aqueous solution of ammonium lignosulphonate immediately prior to palletizing. The loaded pallet was placed on a wagon (before the antiskid coating had dried), which was then released down an incline at the end of which there was a stopping device. The test was started at the lowest stopping velocity, the velocity being successively increased to 2 km/h, 2 ½ km/h, 3 km/h, and so on until the bags were dislodged to the extent that the pallet and its unit load could no longer be considered as transportable. The highest impact velocity achieved without unacceptable dislodging of the bags was 4 km/h. In comparison it can be mentioned that the highest impact velocity achieved in the case of untreated bags in this same test was 2 km/h without unacceptable disloding.

EXAMPLE 2

Example 1 was repeated with paper bags instead of plastic bags, and 40 % aqueous solution of ammonium lignosulphonate. The highest impact velocity achieved without unacceptable disloding of the bags was 4 ½ km/h, at which the load dislodged itself on the pallet, but the unit load remained firmly bonded together.

EXAMPLE 3

Example 1 was repeated with polethylene bags and a 10 % aqueous solution of sodium lignin. The highest impact velocity achieved without unacceptable dislodging was 4 ½ km/h.

APPARATUS

The apparatus illustrated on the drawing was designed to test the various antiskid agents. It consists of a receptacle to which a plate of glass 2 (19 × 9 cm²) is affixed. A device 3 is fitted to one end of the glass plate to which test strips 4 of plastic, etc. can be fastened. An easily rotatable cylinder 5, 3.3 cm in diameter, is mounted at the other end of the glass plate over which an identical test strip 9 is passed. A receptacle 6 is fixed to this strip 9, into which weights are placed during the test. A plate of glass 7 (15 × 5 cm²) is placed on top of the test strips, which with the weight 8 will exert a force of 0.371 kp.

The tests are performed first by cutting the bag material into strips measuring 5 × 30 cm. One of these is affixed to the apparatus, and carefully coated with the anti-skid agent (three drops). Another strip is placed on top of this, after which the glass plate and weight are placed over them. A receptacle is fixed to the strip passing over the cylinder, and weights evenly and carefully placed in the receptacle until the hold between the two strips is broken. This is repeated six times and the average noted.

Reproducible results are obtained in this way. The tests were performed immediately after coating the bag material with antiskid agent (WET) and after drying (DRY).
results:
Table 1 shows the efficiency of ammonium lignosulphonate as an antiskid agent. The results obtained with untreated plastic strips are shown for purposes of comparison.

TABLE 1

|  | Gramme wt. of 3 drops | WET in kp | DRY in kp |
|---|---|---|---|
| 20% ammonium lignosulphonate | 0,115 | 0,780 | 10,800 |
| 10% do. | 0,140 | 0,480 | 10,100 |
| 5% do. | 0,145 | 0,330 | 11,600 |
| 2,5% do. | 0,155 | 0,280 | 6,770 |
| Untreated | — | — | 0.200 |

The first column shows the different systems tested, and the second column the weight of 3 drops of the compositions. The third and fourth columns show the pulling force at WET and DRY load at breakage point.

It will be noted that a 10% ammonium lignosulphonate solution gives 0.48 kp and 10.1 kp at WET and DRY rupture respectively. These values are fully comparable with, if not better than, those obtained by means of traditional silica-sol coatings on paper. Polyethylene-coated paper was also tested and showed the same good results. The polyethylene coating is not damaged on separation after treatment, not even when roughly handled.

In the case of woven plastic bags and plastic bags having a weave-like structure, it may sometimes be difficult to achieve adequate antiskid performance. This is due to the fact that the lignin solution disappears into the spaces between the threads, thus preventing the formation of a continuous moist and adhesive coating. This can be counteracted by adding a suitable non-evaporating composition to increase viscosity. Alcohols with a high boiling point such as glycerol or ethylene-glycol, have been found to be especially well suited for this purpose.

What is claimed is:

1. The method of securing stacked bags having plastic surfaces to prevent the slipping of such surfaces in relation to each other, comprising the application of a coating in the form of an aqueous or predominantly aqueous solution of a soluble lignin compound to the surface of the bags, wherein the concentration of the lignin solution is in the range from about 2.5-40% by weight, said aqueous solution being devoid of polymerization promoting components.

2. The method of claim 1, characterized in that the lignin compound is an alkali lignosulphonate selected from the group consisting of ammonium, sodium, calcium or magnesium lignosulphonate.

3. The method of claim 1, characterized in that the lignin compound is sodium lignin.

4. A method according to claim 1 wherein the plastic surface is a polyolefin surface.

* * * * *